US010717392B2

(12) United States Patent
Engelke

(10) Patent No.: US 10,717,392 B2
(45) Date of Patent: Jul. 21, 2020

(54) SYSTEM AND METHODS FOR VEHICLE-MOUNTED RACK

(71) Applicant: Adam Engelke, Rancho Santa Margarita, CA (US)

(72) Inventor: Adam Engelke, Rancho Santa Margarita, CA (US)

(*) Notice: Subject to any disclaimer, the term of this patent is extended or adjusted under 35 U.S.C. 154(b) by 0 days.

(21) Appl. No.: 16/168,642

(22) Filed: Oct. 23, 2018

(65) Prior Publication Data

US 2019/0152404 A1    May 23, 2019

Related U.S. Application Data

(60) Provisional application No. 62/588,069, filed on Nov. 17, 2017.

(51) Int. Cl.
*B60R 9/02* (2006.01)
*B60K 15/067* (2006.01)
*B60K 15/06* (2006.01)

(52) U.S. Cl.
CPC ............... *B60R 9/02* (2013.01); *B60K 15/06* (2013.01); *B60K 15/067* (2013.01)

(58) Field of Classification Search
CPC ....... B60R 9/00; B60R 9/02; B60R 2011/004; B60R 11/06; B60P 3/002; B60P 7/10; B60K 15/067; B60K 15/06
USPC ............... 224/543, 545, 539, 550, 552, 555, 224/557–558; 296/3
See application file for complete search history.

(56) References Cited

U.S. PATENT DOCUMENTS

| | | | | |
|---|---|---|---|---|
| 5,350,095 | A * | 9/1994 | Stevens | B60P 3/002 224/310 |
| 6,845,894 | B1 * | 1/2005 | Vyvoda | B60R 9/02 224/405 |
| 9,187,046 | B2 * | 11/2015 | Peck | B60R 9/10 |
| 10,106,095 | B1 * | 10/2018 | Farr | B60R 9/02 |
| 2003/0205600 | A1 * | 11/2003 | Couto | B60P 3/075 224/548 |
| 2008/0047993 | A1 * | 2/2008 | Wooten | B60R 9/00 224/325 |
| 2017/0225625 | A1 * | 8/2017 | Zambrano | B60R 9/02 |

* cited by examiner

*Primary Examiner* — Scott T McNurlen
(74) *Attorney, Agent, or Firm* — Cionca IP Law P.C.; Marin Cionca

(57) ABSTRACT

A rack system configured to be mounted onto a side of a vehicle for carrying a container, the rack system having: bracket arms having: a top mounting hole; arm plate mounting holes; arm clamp mounting holes; mounting blocks having: a center block hole; outer block holes; a mounting plate having: inner plate holes; outer plate holes; clamps having: clamp center holes; each mounting block being configured to be mounted onto the vehicle via a first securing means through the outer block holes; each upper arm end being configured to be mounted onto the mounting blocks via a second securing means through the top mounting hole; each bottom arm end being configured to be mounted onto the side via a third securing means through the clamp center holes; and the mounting plate being configured to be mounted onto the bracket arms via a fourth securing means through the outer plate holes.

18 Claims, 9 Drawing Sheets

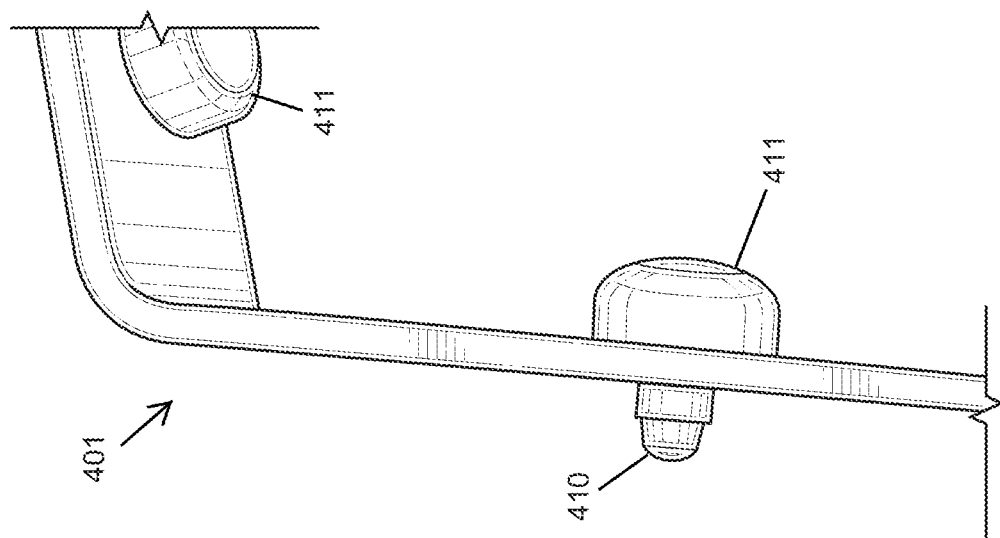

SYSTEM AND METHODS FOR VEHICLE-MOUNTED RACK

CROSS-REFERENCE TO RELATED APPLICATIONS

This application claims priority to U.S. Non-Provisional Application No. 62/588,069, filed Nov. 17, 2017, which is hereby incorporated by reference, to the extent that it is not conflicting with the present application.

BACKGROUND OF INVENTION

1. Field of the Invention

The invention relates generally to a fuel containment and transport, and more specifically to transporting sufficient fuel in a long-distance commute using a rack system for fuel containers and other off-road accessories on a vehicle.

2. Description of the Related Art

Portable fuel containers currently on the market can limit the amount of gasoline can be transported during a commute, and the gasoline carried may not be sufficient for long journeys. Some vehicles allow for the carrying of a gas can on the rear of the vehicle, but again, the amount of fuel is limited and may be insufficient for some users. Some known systems for carrying fuel at the rear of a vehicle limits the amount of fuel to approximately 2 gallons. This can be due to the fact that the vehicle can become off-balance if too much weight is placed at the rear of the vehicle, thus leading to safety issues. The amount of fuel that can be carried at the rear of a vehicle can be insufficient for some users, and this inability to carry a large amount of fuel can pose a serious issue for drivers or users who choose to commute off-road, such as, for example, commuting "overland" style in a Jeep Wrangler, or for people embarking on long camping trips, or commuting any place where refueling may not be possible. Proper weight distribution when carrying a large amount of fuel must also be accounted for when transporting fuel, and if not appropriately distributed, the cargo can become a hazard or safety concern for the user or driver and passengers. Some users may also need their vehicles for short commutes as well as longer commutes, and thus, it would be beneficial for the user to be provided with a way of quickly modifying a vehicle to allow the carry of a large amount of fuel, and quickly remove the modification such that the vehicle is free of the cargo when used for shorter trips. Some systems exist for allowing a vehicle to carry a limited amount of fuel in small cans (such as 2 gallons), but these systems require the permanent modification of the vehicle. As an example, the full and permanent removal of the side window or modifications to the hard top may be required, and may be undesirable for a user that wishes for a non-permanent system that does not require the alteration of their vehicle. Therefore, there is a need for a solution to these problems.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect a system is provided for assembling and mounting a removable rack system to a vehicle, without the need for removal or destruction of any parts of the vehicle, such that the rack system can carry up to an example of sixteen gallons of fluid such as fuel on a vehicle, wherein the added weight is evenly distributed on both sides of the vehicle. Thus, an advantage is that a large amount of fuel, such as sufficient fuel for an extended commute, may be carried by the user on the vehicle and the user may drive to areas where refueling may not be possible. Another advantage is that the added weight of the carried fuel or other fluid or cargo may be more safely handled by the even distribution of weight on the sides of the vehicle than that of a vehicle carrying extra weight at the rear, due to the additional weight being properly balanced on both sides of the vehicle, which can increase the safety of the user and decrease the possibility of an accident caused by an imbalanced vehicle. Another advantage may be that the added bulk or weight of the containers for the fuel or other fluids may be easily removed when a large amount of fuel is not needed by the user, without the need for heavy modification to the vehicle by the user. Another advantage is that the vehicle may be minimally modified, and the hardtop of the vehicle may remain substantially whole with only drilled holes and without the need for removal of any vehicle parts or windows.

In another aspect, a rack system for carrying a container and contents of the container on a first side of a vehicle is provided, the rack system being configured to be mounted onto the first side of the vehicle, the rack system comprising a first set of mounting components having: a pair of bracket arms, each bracket arm of the pair of bracket arms having: an upper arm end; a bottom arm end; an arm body extending between the upper arm end to the bottom arm end; a top mounting hole within the upper arm end; a set of arm plate mounting holes within the arm body; and a set of arm clamp mounting holes within the bottom arm end; wherein the upper arm end is bent at an angle with respect to the arm body and the bottom arm end; a pair of mounting blocks, each mounting block of the pair of mounting blocks having: a center block hole; a left block side; a right block side; and a set of outer block holes disposed on the left block side and the right block side; a mounting plate having: a set of inner plate holes; a left plate side; a right plate side; and a set of outer plate holes disposed on the left plate side and on the right plate side; a pair of clamps, each clamp of the pair of clamps having: a clamp body; and a set of clamp center holes within the clamp body; each mounting block of the pair of mounting blocks being configured to be mounted onto a top side of the vehicle via a first set of securing means, wherein the first set of securing means is drilled into the top side of the vehicle through the set of outer block holes; each upper arm end being configured to be mounted onto a mounting block of the pair of mounting blocks via a second set of securing means, wherein the second set of securing means is secured through the top mounting hole and the center block hole; each clamp of the pair of clamps being configured to be associated with the bottom arm end of each bracket arm of the pair of bracket arms; each bottom arm end being configured to be mounted onto the first side of the vehicle via a third set of securing means, wherein the third set of securing means is secured through the set of clamp center holes and the set of arm clamp mounting holes; and the mounting plate being configured to be mounted onto the pair of bracket arms via a fourth set of securing means, the fourth set of securing means being secured through the set of outer plate holes and the set of arm plate mounting holes. Thus, again, an advantage is that a large amount of fuel, such as sufficient fuel for an extended commute, may be carried by the user on the vehicle and the user may drive to areas where refueling may not be possible. Another advantage may be that the added bulk or weight of the containers for the fuel or other fluids may be easily removed when a large amount of fuel is not needed by the user, without the need for heavy modification to the vehicle by the user, and without the need for assistance from another person. Another advantage is that the vehicle may be minimally modified, and the hardtop of the vehicle may remain substantially whole with only drilled holes and without the need for removal of any vehicle parts or windows. Another advantage is that the gasoline canisters may be filled without removing the canisters or containers from the racks, thus providing the user with an easy and efficient method of loading and carrying the gasoline.

In another aspect, a rack system for carrying containers and contents of the containers on a vehicle is provided, the rack system being configured to be mounted onto a first side and a second side of the vehicle, the second side being opposite to the first side, the rack system comprising: a plurality of bracket arms, each bracket arm of the plurality of bracket arms having: an upper arm end; a bottom arm end; a front arm side; a rear arm side; an arm body extending between the upper arm end to the bottom arm end; a top mounting hole within the upper arm end; a set of arm plate mounting holes within the arm body; a set of arm clamp mounting holes within the bottom arm end; and a plurality of stopper holes; wherein the upper arm end is bent at an angle with respect to the arm body and the bottom arm end; a plurality of mounting blocks, each mounting block of the pair of mounting blocks having: a center block hole; a left block side; a right block side; and a set of outer block holes disposed on the left block side and the right block side; a plurality of mounting plates, each mounting plate of the plurality of mounting plates having: a set of inner plate holes; a left plate side; a right plate side; and a set of outer plate holes disposed on the left plate side and on the right plate side; a plurality of clamps, each clamp of the plurality of clamps having: a clamp body; and a set of clamp center holes within the clamp body; a plurality of stoppers; and a plurality of screw caps; each mounting block of the plurality of mounting blocks being configured to be mounted onto a top side of the vehicle via a first set of securing means, wherein the first set of securing means is drilled into the top side of the vehicle through the set of outer block holes; each upper arm end being configured to be mounted onto a mounting block of the plurality of mounting blocks via a second set of securing means, wherein the second set of securing means is secured through the top mounting hole and the center block hole; each clamp of the plurality of clamps being configured to be associated with the bottom arm end of each bracket arm of the plurality of bracket arms; each bottom arm end being configured to be mounted onto the first side or the second side of the vehicle via a third set of securing means, wherein the third set of securing means is secured through the set of clamp center holes and the set of arm clamp mounting holes; the mounting plate being configured to be mounted onto the plurality of bracket arms via a fourth set of securing means, the fourth set of securing means being secured through the set of outer plate holes and the set of arm plate mounting holes; each stopper of the plurality of stoppers being configured to fit into a stopper hole of the plurality of stopper holes on the rear arm side; and each screw cap of the plurality of screw caps being configured to be screwed onto each stopper of the plurality of stoppers on the front arm side; such that the rack system is configured to distribute a first weight of the containers on the first side and a second weight of the containers on the second side. Thus, again, an advantage is that a large amount of fuel, such as sufficient fuel for an extended commute, may be carried by the user on the vehicle and the user may drive to areas where refueling may not be possible. Another advantage may be that the added bulk or weight of the containers for the fuel or other fluids may be easily removed when a large amount of fuel is not needed by the user, without the need for heavy modification to the vehicle by the user, and without the need for assistance from another person. Another advantage is that the vehicle may be minimally modified, and the hardtop of the vehicle may remain substantially whole with only drilled holes and without the need for removal of any vehicle parts or windows. Another advantage is that the gasoline canisters may be filled without removing the canisters or containers from the racks, thus providing the user with an easy and efficient method of loading and carrying the gasoline.

In another aspect, a method of mounting and using a rack system on a vehicle having a top side, a first side, and a second side opposite to the first side is provided, the rack system being configured for carrying a container and contents of the container, the rack system comprising a first set of mounting components having: a pair of bracket arms, each bracket arm of the pair of bracket arms having: an upper arm end; a bottom arm end; an arm body extending between the upper arm end to the bottom arm end; a top mounting hole within the upper arm end; a set of arm plate mounting holes within the arm body; and a set of arm clamp mounting holes within the bottom arm end; wherein the upper arm end is bent at an angle with respect to the arm body and the bottom arm end; a pair of mounting blocks, each mounting block of the pair of mounting blocks having: a center block hole; a left block side; a right block side; and a set of outer block holes disposed on the left block side and the right block side; a mounting plate having: a set of inner plate holes; a left plate side; a right plate side; and a set of outer plate holes disposed on the left plate side and on the right plate side; a pair of clamps, each clamp of the pair of clamps having: a clamp body; and a set of clamp center holes within the clamp body; each mounting block of the pair of mounting blocks being configured to be mounted onto a top side of the vehicle via a first set of securing means, wherein the first set of securing means is drilled into the top side of the vehicle through the set of outer block holes; each upper arm end being configured to be mounted onto a mounting block of the pair of mounting blocks via a second set of securing means, wherein the second set of securing means is secured through the top mounting hole and the center block hole; each clamp of the pair of clamps being configured to be associated with the bottom arm end of each bracket arm of the pair of bracket arms; each bottom arm end being configured to be mounted onto the vehicle via a third set of securing means, wherein the third set of securing means is secured through the set of clamp center holes and the set of arm clamp mounting holes; and the mounting plate being configured to be mounted onto the pair of bracket arms via a fourth set of securing means, the fourth set of securing means being secured through the set of outer plate holes and the set of arm plate mounting holes; the method comprising the steps of: determining a length between the pair of mounting blocks; placing the pair of mounting blocks on the top side of the vehicle such that the pair of mounting blocks is aligned along the first side; using the set of outer block holes as drilling guides; drilling a set of holes into the top side where indicated by the drilling guides; securing the pair of mounting blocks to the top side via the first set of securing means through the set of outer block holes; aligning each top mounting hole with each center block hole; securing each bracket arm of the pair of bracket arms to a mounting block of the pair of mounting blocks via the second set of securing means through the top mounting hole and the center block hole; aligning each set of clamp center holes with each set of arm clamp mounting holes; securing each clamp of the pair of clamps to a bracket arm of the pair of bracket arms via the third set of securing means through the set of clamp center holes and the set of arm clamp mounting holes; aligning a first portion of the outer plate holes of the set of outer plate holes with a first set of arm plate mounting holes of the set of arm plate mounting holes; aligning a second portion of the outer plate holes of the set of outer plate holes with a second set of arm plate mounting holes of the set of arm plate mounting holes; securing the mounting plate to the pair of bracket arms via the fourth set of securing means through the set of outer plate holes and the set of arm plate mounting holes. Thus, again, an advantage is that a large amount of fuel, such as sufficient fuel for an extended commute, may be carried by the user on the vehicle and the user may drive to areas where refueling may not be possible. Another advantage may be that the added bulk or weight of the containers for the fuel or other fluids may be easily removed when a large amount of fuel is not needed by the user, without the need for heavy modification to the vehicle by the user, and without the need for assistance from another person. Another advantage is that the vehicle may be minimally modified, and the hardtop of the vehicle may remain substantially whole with only drilled holes and without the need for removal of any vehicle parts or windows. Another advantage is that the gasoline canisters may be filled without removing the canisters or containers from the racks, thus providing the user with an easy and efficient method of loading and carrying the gasoline.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 4 shows the partial side view of the bracket arm with stoppers fastened onto the front side of the arm and a washer and a screw cap securing the stopper from the back of the arm, as a third step of the exemplary method, according to an aspect.

DETAILED DESCRIPTION

Figure 1:
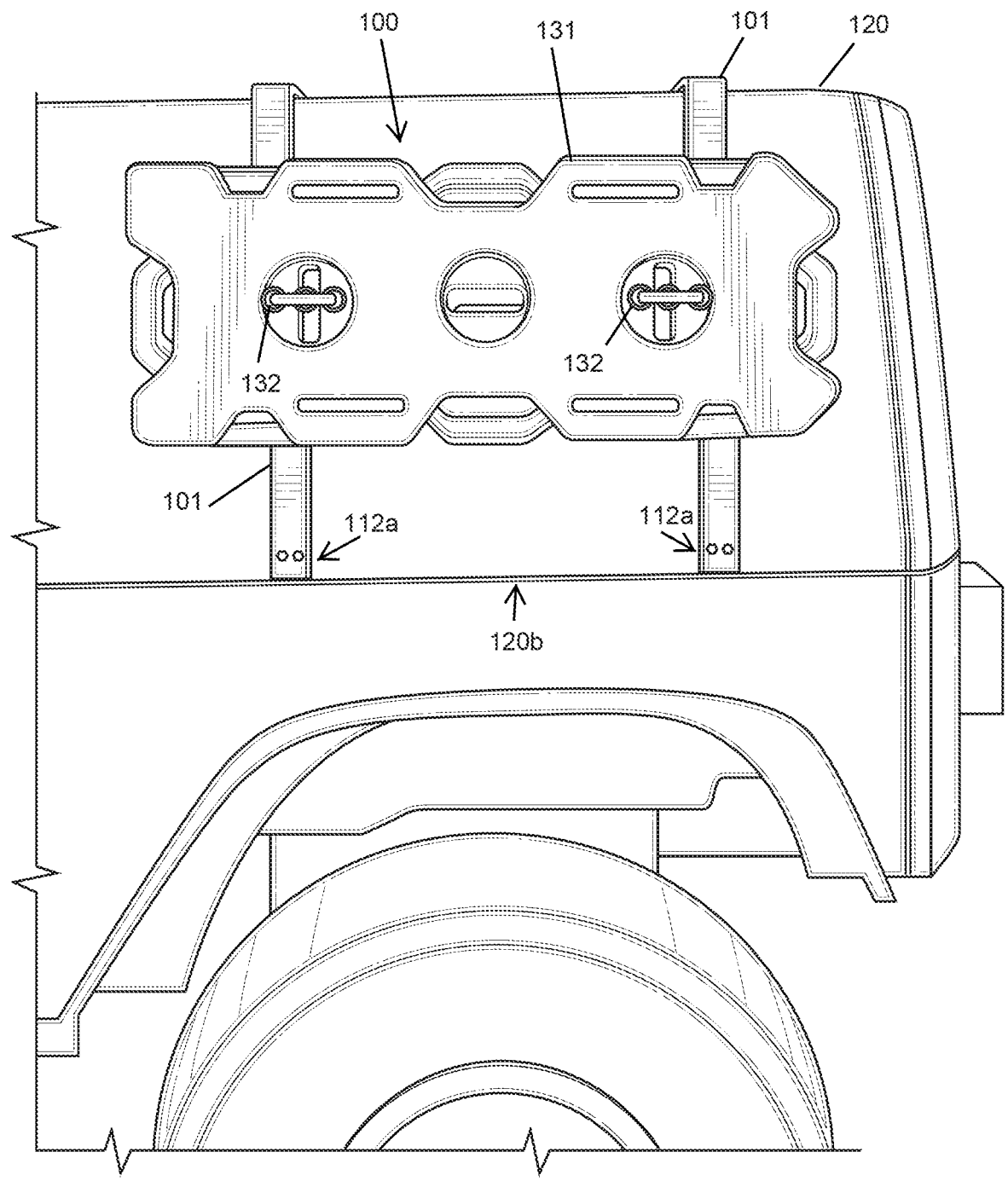
FIG. 1 illustrates the side view of a rack and bracket system carrying a gasoline container on a left side of an exemplary vehicle, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 101 and 201, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates the side view of a rack and bracket system ("rack and bracket system," "rack system," or "system") 100 for side-mounted cargo on a vehicle, according to an aspect. As shown as an example in FIG. 1, the rack and bracket system 100 may carry a gasoline container 131 on a left side of an exemplary vehicle 120. The rack and bracket system 100 may be used for carrying containers such as gasoline containers 131 or any other similar container or cargo, and the system 100 may be mounted to one or both sides of a vehicle 120. As an example, the rack system may be used with a hardtop vehicle ("hardtop vehicle" or "hardtop") such as a Jeep Wrangler. A user may be able to travel with more fuel using the rack system 100 than by using a system known in the art which carries the fuel at the rear of a vehicle, due to the more advantageous balancing of the added weight when the fuel is carried at the sides of the vehicle. Rather than having the extra fuel's total weight concentrated on the rear of the vehicle, this rack and bracket system 100 may evenly distribute the weight on the left and right sides of the vehicle, and thus help to make traveling more efficient and with a ready full supply of fuel.

The rack system 100 may be completely and easily removable, and also may not require the displacement or removal of any automobile windows or hard tops for its installation onto the vehicle 120. The rack system 100 may hold up to sixteen gallons of gasoline or other fluids and may carry up to eight gallons on each side of the vehicle 120. Extensions ("extensions," "container carriers," or "container carrying extensions"), of which a partial view is shown by 132 (and shown in more detail by 932 in FIG. 9) may be used to hold and lock containers 131 in place, such as containers for fuel or any other fluids, or any other suitable type of cargo. As an example, containers 131 may hold up to 8 gallons of fluid on each side of the vehicle having a rack system 100. The example shown in FIG. 1, on a left side of a vehicle 120, may be a single container 131 holding approximately 4 gallons of fluid, for example.

The rack system 100 may be provided with various mounting components for easy attachment to and removal from the vehicle 120. The components, discussed in further detail when referring to FIG. 2, may include mounting arms 101 that grip the sides and top of the vehicle 120. The mounting arms 101 may be attached to the vehicle 120 using clamps (shown in further detail by 212 in FIG. 2, and by 812 in FIGS. 8A-8B), which may be located at the regions indicated by 112a. The clamps may be clipped onto the underside 120b of the vehicle hardtop.

Figure 2:
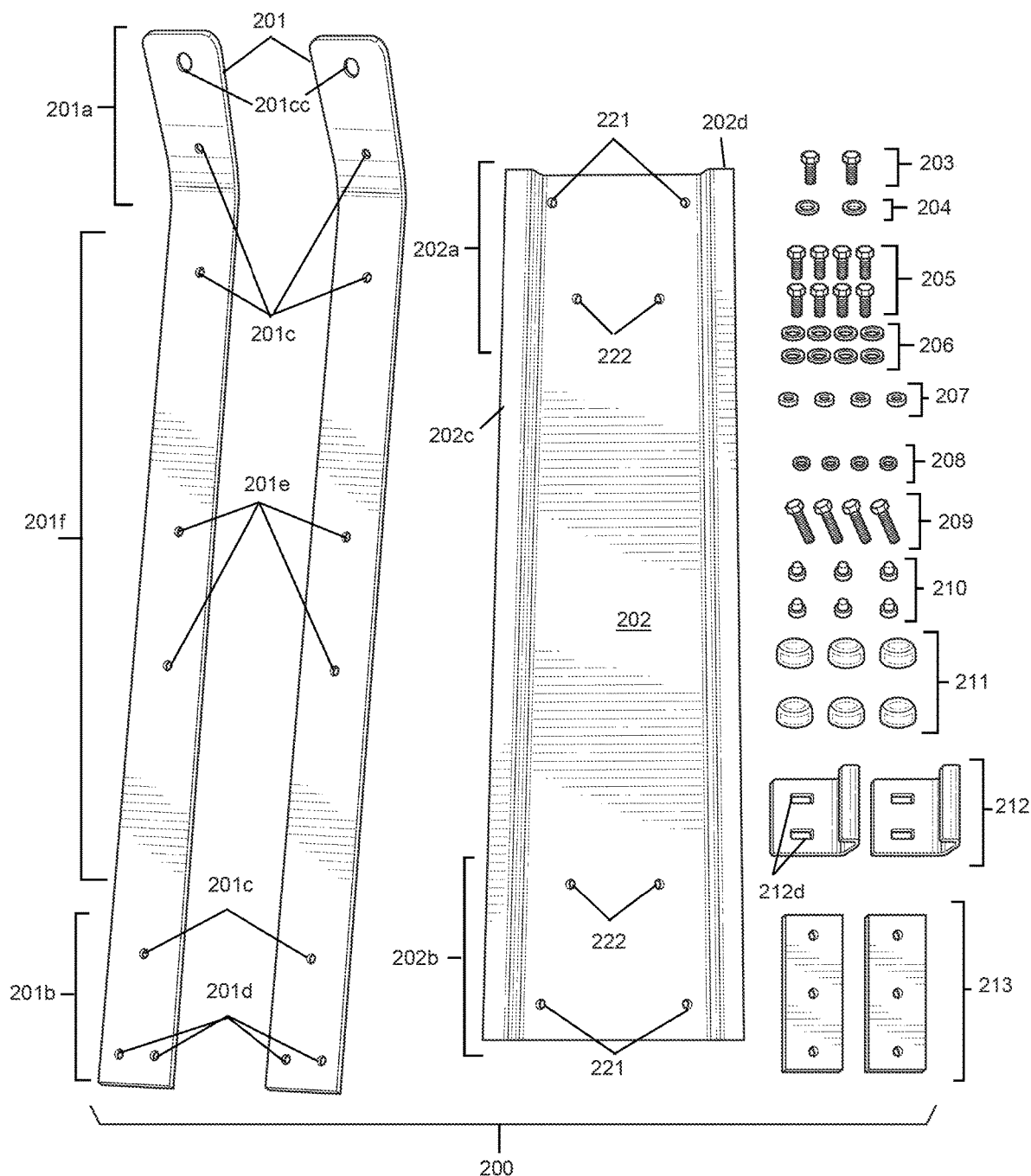
FIG. 2 illustrates a front perspective view of elements that may comprise the rack and bracket system prior to assembly, according to an aspect.

FIG. 2 illustrates a front perspective view of elements that may comprise the rack and bracket system 200 prior to assembly, according to an aspect. The following is an exemplary list of parts and an exemplary number of parts needed to fully assemble and mount a rack system 200 on both left and right sides of a vehicle, while FIG. 2 shows half of the exemplary number of parts needed (equal to the number of parts needed for mounting of the rack system 200 on a single side of a vehicle): four bracket arms ("bracket arms" or "arms") 201, two mounting plates ("mounting plate" or "plate") 202, four mounting blocks ("mounting blocks" or "blocks") 213, four clamps 212, twelve rubber stoppers ("rubber stoppers" or "stoppers") 211, twelve plastic screw caps ("screw caps," or "capped screws") 210, eight riveted screws ("riveted screws" or "rivet screws") 209, eight locking nuts ("locking nuts" or "nuts") 208, eight rubber washers ("rubber washer" or "washer") 207, sixteen small aluminum washers ("small aluminum washer" or "small washer") 206, sixteen aluminum 7/16 inch bolts ("7/16 bolts" or "7/16 inch bolts") 205, four large aluminum washers ("large aluminum washer" or "large washer") 204, and four aluminum ½ bolts ("bolts" or "½ bolts") 203.

The components shown in FIG. 2 may be used in the following exemplary manners. The rivet screws 209, the rubber washers 207, and the nuts 208 may be used in association with each other, in order to secure a mounting block to a vehicle, and may comprise a first set of securing means. The large washer 204 may be used in association with the ½ bolt 203, in order to secure the arms 201 to the mounting blocks 213, and may comprise a second set of securing means. The small washer 206 may be used together with the 7/16 inch bolt 205. The small washer 206 and the 7/16 inch bolt 205 may be used as a third set of securing means for associating the clamp 212 to the bracket arm 201, and may also be used as a fourth set of securing means for associating the mounting plate 202 to the bracket arm 201. The screw caps 210 may be used in association with the stoppers 211, on the mounting arms 201. The 7/16 inch bolts 205 and the smaller washers 206 may be used in association with each other to secure the mounting plate 202 to the arms 201.

It should be understood that other various suitable parts of any suitable size may also be used for the assembly and mounting of the rack and bracket system 200. As an example, the various components and parts of the rack and bracket system 200 may be powder coated, or finished by any other suitable means or methods. As an example, the bracket arms may be powder coated, and may be satin black powder coated, or may be provided as raw steel, as another example. Thus, an advantage may be that the rack system may be customizable to fit the user's needs. It should also be understood that other custom mounts may be used with the rack and bracket system 200 for other gear or items in addition to the gasoline containers.

For mounting onto one side of a vehicle, two bracket arms 201 may be provided. Each bracket arm 201 may be provided with top arm mounting holes ("top arm mounting holes" or "top mounting holes") 201cc at their top end 201a, which may be used for attaching the bracket arm 201 to a mounting block 213. Each bracket arm 201 may also be provided with stopper holes ("arm stopper holes," or "stopper holes") 201c which may be used for attaching stoppers 211. As an example, each bracket arm 201 may be provided with three stopper holes 201c. Each bracket arm 201 may also be provided with arm clamp mounting holes ("arm clamp mounting holes" or "clamp mounting holes") 201d at their bottom end 201b, which may be used for associating the bracket arm 201 with a clamp 212. Two arm clamp mounting holes 201d may be provided. Each clamp 212 may be provided with two clamp center holes 212d, which may be aligned with the arm clamp mounting holes 201d. Each bracket arm 201 may also be provided with arm plate mounting holes 201e, which may be used for associating the bracket arm 201 with a mounting plate 202. Two arm plate mounting holes 201e may be provided in each bracket arm 201. The upper arm end 201a may be bent at an angle with respect to the arm body 201f and the bottom arm end 201b. As an example, the angle may be approximately 90 degrees such that the upper arm end 201a can rest on the top of a vehicle while the arm body 201f and the bottom arm end 201b are aligned with the side of a vehicle.

For mounting onto one side of a vehicle, one mounting plate 202 may be provided. Additional mounting plates may also be provided as needed, such as one additional mounting plate for mounting the rack system to the opposite side of the vehicle. Each mounting plate 202 may be substantially rectangular and may be provided with a set of outer plate holes 221 closer to the edge of the plate, and a set of inner plate holes 222, and may have outer plate holes 221 and inner plate holes 222 at both the right end 202a and the left plate end 202b of the mounting plate 202 (viewed as left and right sides when the mounting plate 202 is viewed horizontally; with the mounting plate 202 in FIG. 2 shown in a vertical position). As an example, each set of holes may be two holes, wherein the right plate end 202a has two outer plate holes 221 and two inner plate holes 222, and the left plate end 202b has two outer plate holes 221 and two inner plate holes 222, for a total of eight holes on each mounting plate 202. Each mounting plate 202 may also be provided with a raised edge or lip at the top and bottom end, and thus may be provided with a top plate lip 202c, and a bottom plate lip 202d (again, viewed as the top and bottom ends when the mounting plate is viewed horizontally, with the mounting plate 202 in FIG. 2 shown in a vertical position).

The elements or components used in an exemplary method for assembling and mounting a rack system on a vehicle are shown as an example in FIG. 2. The mounting block hardware may include the rivet screws 209, the rubber washers 207, and the nuts 208. As an exemplary first step in the method for assembling and mounting the rack system on a vehicle, the mounting block hardware may be separated from the remaining elements for ease of assembly. As an example, the mounting blocks 213 may be secured to the top of the vehicle using the rubber washers 207 (which may as an example be riveted rubber washers), the locking nuts 308, and the riveted screws 209.

Figure 3B:
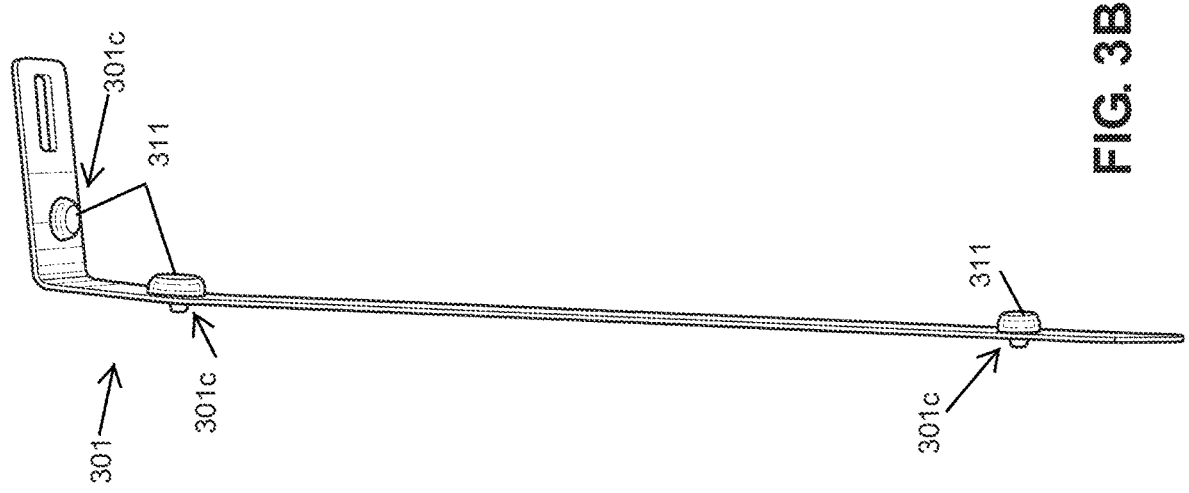
FIGS. 3A-3B illustrate the partial front view of the top end, and a side view, respectively, of a bracket arm in a second step of an exemplary method, according to an aspect.
Figure 3A:
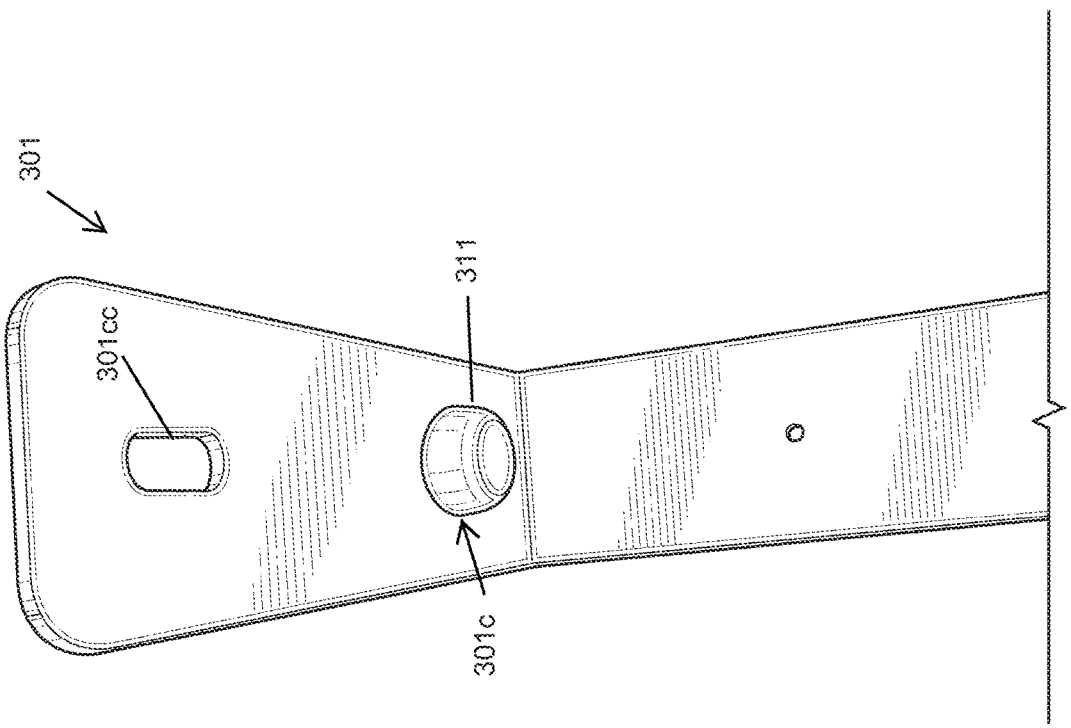

FIGS. 3A-3B illustrate the partial front view of the top end, and a side view, respectively, of a bracket arm ("bracket," "bracket arm" or "arm") 301 in a second step of an exemplary method, according to an aspect. Stoppers 311, which may be constructed from rubber, may be tightened by hand onto the inside of the arm 301 as shown in FIGS. 3A-3B. Again as an example, three stopper holes (as shown by 201c in FIG. 2) may be provided on the arm 301, each for the placement of a stopper 311. The process may then be repeated for each arm 301 as needed. In FIG. 3B, three holes (not visible) are shown with stoppers 311 inserted, and the placement of such holes 301c are thus apparent in FIG. 3B. The top mounting hole 201cc may be used, again, for associating the bracket arm 201 with a mounting block.

FIG. 4 shows the partial side view of the bracket arm 401 with stoppers 411 fastened onto the front side of the arm 401 and a screw cap 410 securing the stopper 411 from the back of the arm 401, as a third step of the exemplary method, according to an aspect. The stoppers 411 may be constructed from rubber, and the screw caps 410 may be constructed from plastic, for example. The process may be repeated for securing all stoppers 411 affixed onto the arms 401, and the screw caps 410 may be tightened onto the bracket arm 401 by hand or by using a suitable tool.

Next, the plates ("plates" or "mounting plates," as shown by 202 in FIG. 2) may be mounted to the brackets 401. As an example, a bracket may be mounted to each set of outer plate holes 221 of the plate 202. A ⁷⁄₁₆ socket may be used to tighten a ⁷⁄₁₆ bolt and an associated washer to the bracket. Again, as discussed when referring to FIG. 1, extensions may be added to the inner plate holes 222, such that containers 131, which may be fuel containers, may be held by the extensions. The extensions may also carry water containers, storage containers, or any other suitable cargo, for example. These extensions may allow for the carrying of an additional fuel can on the vehicle as discussed, and up to two fuel cans (as shown by 131) may be carried on each side of the vehicle.

Figure 5:
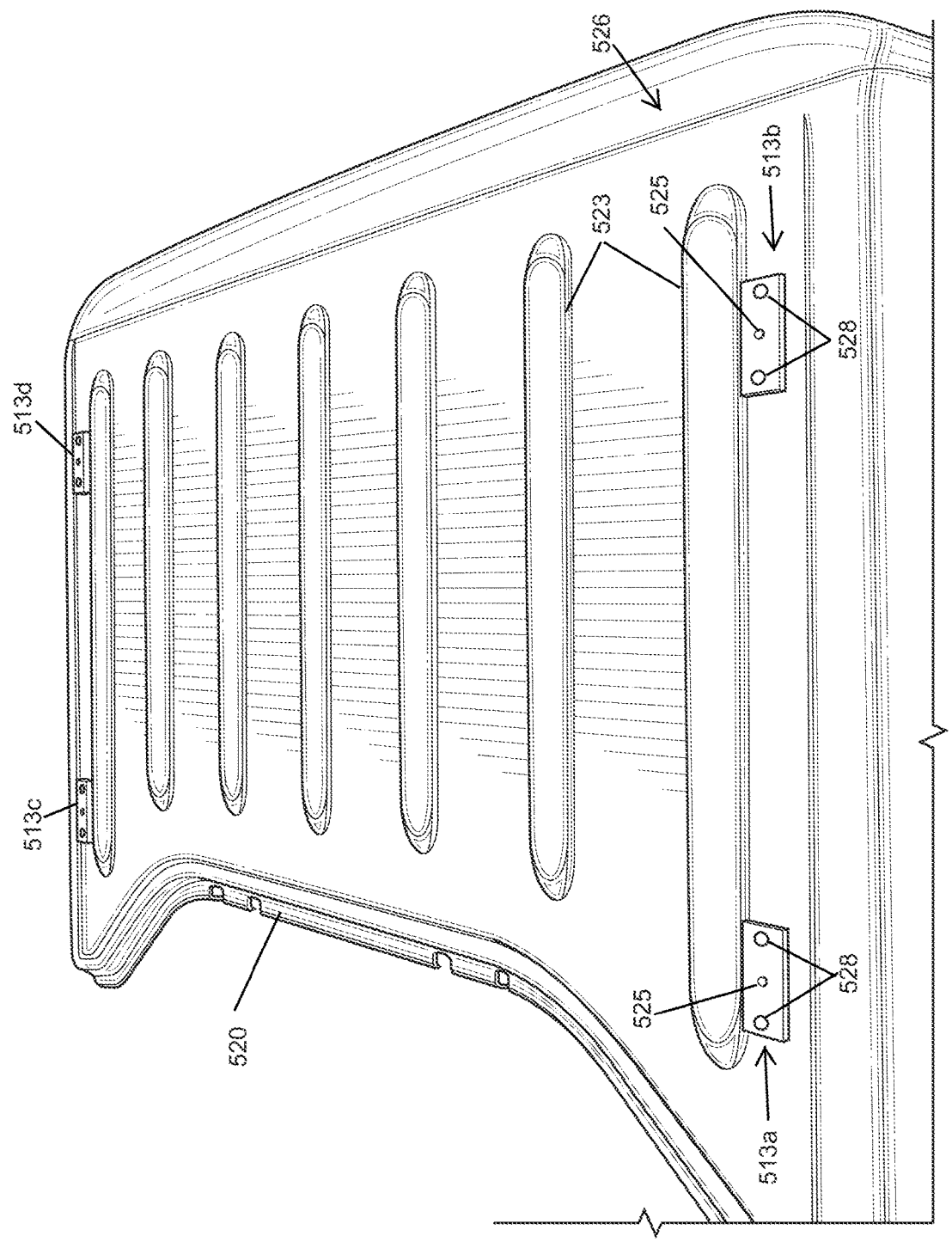
FIG. 5 shows the top perspective view of a set of four mounting blocks secured to a hardtop vehicle, according to an aspect.

FIG. 5 shows the top perspective view of a set of four mounting blocks 513a-513d secured to a hardtop vehicle 520, according to an aspect. The hardtop vehicle 520 is represented by the hardtop roof of the vehicle, which is isolated from the rest of the vehicle for visual clarity in FIG. 5. The fourth through eighth steps of the exemplary method are discussed by referring to FIG. 5.

As a fourth step of the exemplary method, the mounting blocks 513a-513d as shown in FIG. 5 may, in preparation for drilling of the vehicle hardtop roof, be placed on top of a vehicle to be fitted with the rack system. As an example, the rack system may be used for a hardtop vehicle having hardtop ribs 523. The blocks 513a-513d may each be placed on top of the hardtop 520 as close to a rib 523 as possible.

An example of a placement may be placing the mounting blocks as close as possible to the rib 523 located closest to the edge of the hardtop. An advantage may be that this positioning may provide the strongest support to the mounting hardware for drilling, on a vehicle such as a Jeep Wrangler.

As a fifth step of the exemplary method, the alignments and placements of the mounting blocks 513a-513d on a left side of the top of a vehicle, and on a right side of the top of the vehicle 520 may be determined, and the distances between the mounting blocks may also be determined. Two blocks 513a and 513b may be aligned on the left side of the vehicle 520, and the blocks may be placed at an appropriate or predetermined distance apart from each other in order to provide sufficient support to the rack system. Similarly, two blocks 513c and 513d may be aligned on the right side of the vehicle 520, and again, the blocks may be placed at an appropriate or predetermined distance apart from each other in order to provide sufficient support to the rack system.

Each mounting block 513, 513a, 513b may be provided with a center block hole 525, and a pair of outer block holes 528, with one outer block hole 528 on either side of the center block hole 525 when the mounting block is viewed horizontally. That is, an outer block hole 528 may be provided on a left side of the mounting block, and an outer block hole 528 may also be provided on a right side of the mounting block.

The distances between the blocks on either side may be determined by measuring the blocks on-center; as an example, this may be achieved by measuring the distance between the center hole of a first mounting block and the center block hole 525 of a second mounting block. After placement of the first block 513a, the center block hole 525 of the first block may be used as a starting point for measuring the distance to place the second block 513b. From the center block hole 525 of the first block 513a, the center block hole 525 of the second block 513b may be approximately 23.375 inches away. As an example, the same distance of approximately 23.375 inches between the center holes of the two blocks may be used for both two-door and four-door hardtop vehicles. Next, the process may be repeated for the placement of blocks on the other side of the vehicle. As another example, any other appropriate distance may be used for the placement of the blocks, according to the needs of the user or the size and shape of the vehicle to be mounted with the rack system.

Each mounting block may next be used as a guide for drilling holes in the hardtop 520, as a sixth step of an exemplary method. Holes may be drilled into the vehicle 520 at the position of each of the outer block holes 528 of each mounting block, for example. The placement of the outer block holes 528 may be marked onto the hardtop and then next the holes may be drilled into the hardtop, or the mounting block may be left in place to be used as a guide while drilling, such that a drill can be inserted into the outer block holes 528 to perform the drilling. As an example, a ¼ inch drill bit may be used for this step, or any other suitable tool.

Various examples of distances and placements that may be used for the rack system's mounting blocks 513a-513d on two-door hardtops and four-door hardtops are as follows. For two-door hardtops, the center block hole 525 of a mounting block 513b on one side of a vehicle may be a distance of approximately 8.5 inches from a seam 526 of the back of the hardtop. For four-door hardtops, the center block hole 525 of the mounting block 513b may be a distance of approximately 3 inches from the seam 526 of the back of the hardtop. Other suitable distances may also be used according to the needs of the user or the size and shape of the vehicle to be mounted with the rack system.

As a sixth step in the exemplary method, each mounting block 513a-513d may be used as a guide for drilling holes into the vehicle 520. After the placement of each mounting block 513a-513d is determined, a marking may be made by any suitable means onto the vehicle 520 to show the position of the holes. The placement of the outer block holes 528 may be marked onto the hardtop, again for serving as drilling guides, and the mounting blocks may be removed, and then next the holes may be drilled into the hardtop, or the mounting block may be left in place to be used itself as a guide while drilling. As an example, a ¼ inch drill bit may be used for this step, or any other suitable tool may also be used.

Figure 6:
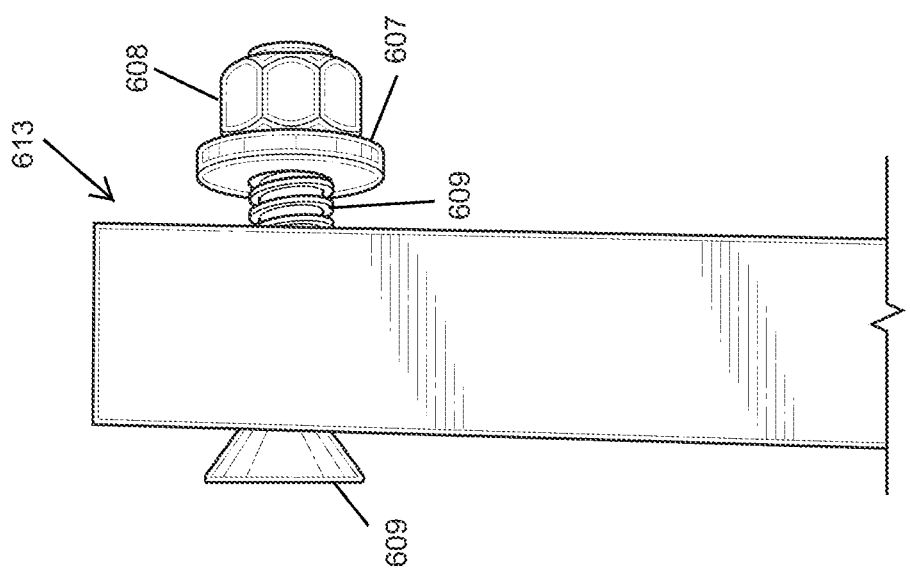
FIG. 6 shows a partial side view of the securing means for a mounting block, as an example of a seventh step of the exemplary method, according to an aspect.

FIG. 6 shows a partial side view of the securing means for a mounting block 613, as an example of a seventh step of the exemplary method, according to an aspect. Mounting blocks 613 may be secured to the hardtop vehicle (as shown in FIG. 5) by using the following exemplary securing means: a riveted screw 609 is inserted through the top of the block 613 through the outer block hole (as shown by 528 in FIG. 5), next and tightened on the opposite side of the block with a riveted rubber washer 607 and a locking nut 608.

Figure 7:
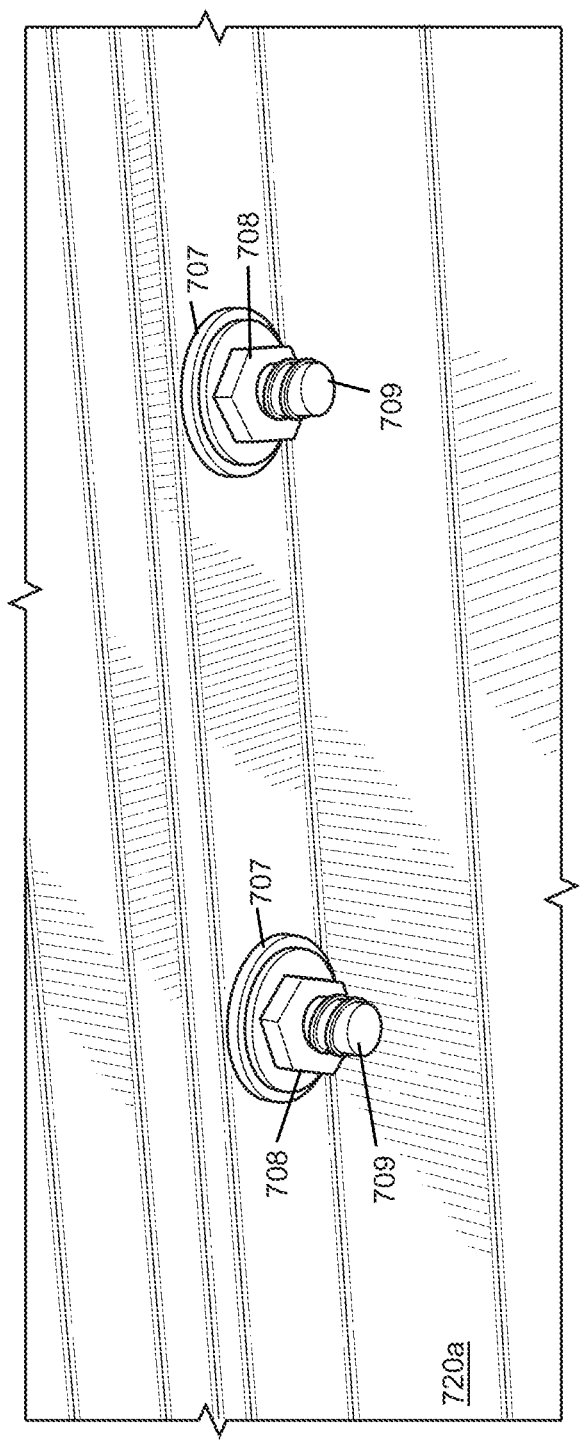
FIG. 7 shows the securing means for the mounting block from the cabin or interior of the vehicle, as another view of the example of the seventh step of an exemplary method, according to an aspect.

FIG. 7 shows the securing means for the mounting block from the cabin or interior of the vehicle, as another view of the example of the seventh step of an exemplary method as shown in FIG. 6, according to an aspect. As an example, a partial view of the securing means may be visible from the interior of the vehicle. As seen on the interior surface 720a of the cabin of the vehicle, the mounting block (as shown by 613 in FIG. 6) may be secured to the vehicle using riveted rubber washers 707, locking nuts 708, and riveted screws 709.

As an example, the process as depicted and described when referring to FIGS. 5-6 may be repeated as needed such that a set of four mounting blocks are mounted securely to the hardtop (as shown by FIG. 5), or any other suitable number of mounting blocks as needed by the user or according to the size and shape of the vehicle being mounted with a rack system.

Figure 8A:
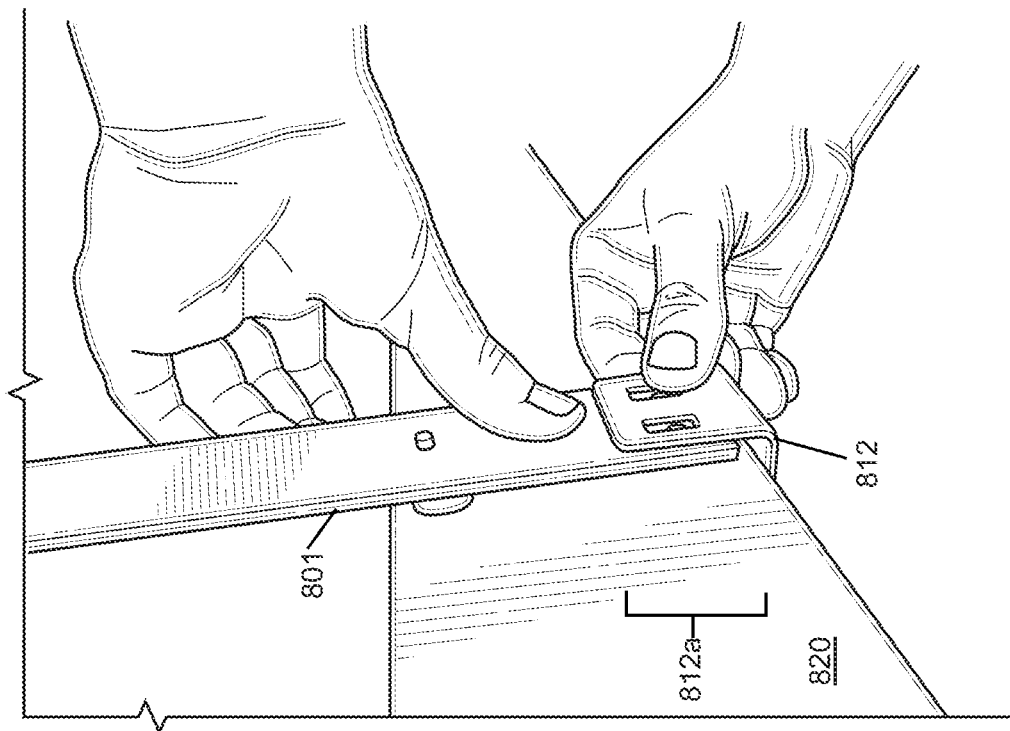
FIGS. 8A-8B show the alignment of a single bracket arm with a single clamp for attachment of the bracket system to the bottom end of the hardtop, as a ninth step in an exemplary method, according to an aspect.
Figure 8B:
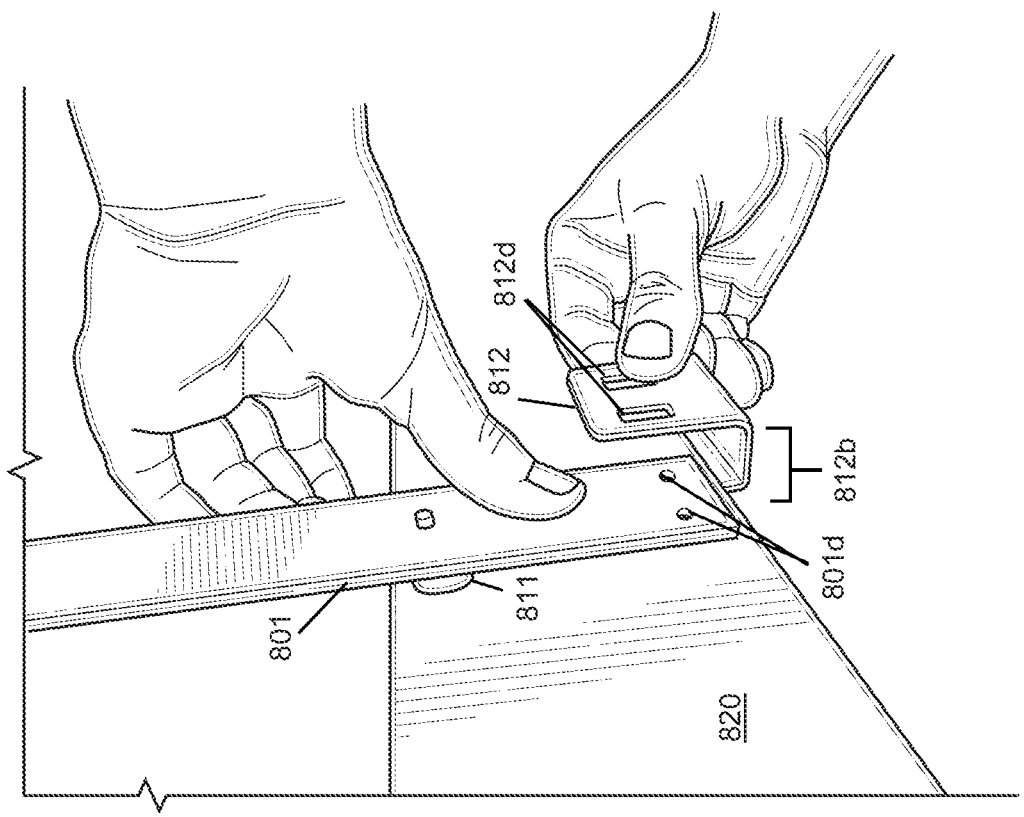

FIGS. 8A-8B show the alignment of a single bracket arm 801 with a single clamp 812 for attachment of the bracket system to the bottom end of the hardtop, as a ninth step in an exemplary method, according to an aspect. The bracket arm 801 is also shown fitted with a stopper 811. First, as shown in FIG. 8A, the clamp 812 may be slipped under the hardtop. The clamp 812 may be clipped under the lip of the body of the vehicle, or under the hardtop lip. Next, as shown in FIG. 8B, the clamp 812 may be slid over the bottom end of the bracket arm 801 and fitted over the arm to be bolted in. The bottom end of the bracket arm 801 may be provided with arm clamp mounting holes 801d, which may be aligned with the clamp center holes 812d of the clamp 812. Arm 801 and bracket 812 may secured with two ⁷⁄₁₆-inch bolts and two small aluminum washers (shown by 206 in FIG. 2) fitted through the arm clamp mounting holes 801d and the clamp center holes 812d. The process may be repeated with the remaining arm and clamp sets.

As is shown as an example, each clamp 812 may be substantially L-shaped, having a clamp body 812a and a clamp bottom end 812b extending outwards from the clamp body 812a, such that the clamp bottom end 812b may extend along the underside of the hardtop 820, and the clamp body 812a may extend along the side of the hardtop 820.

Figure 9:
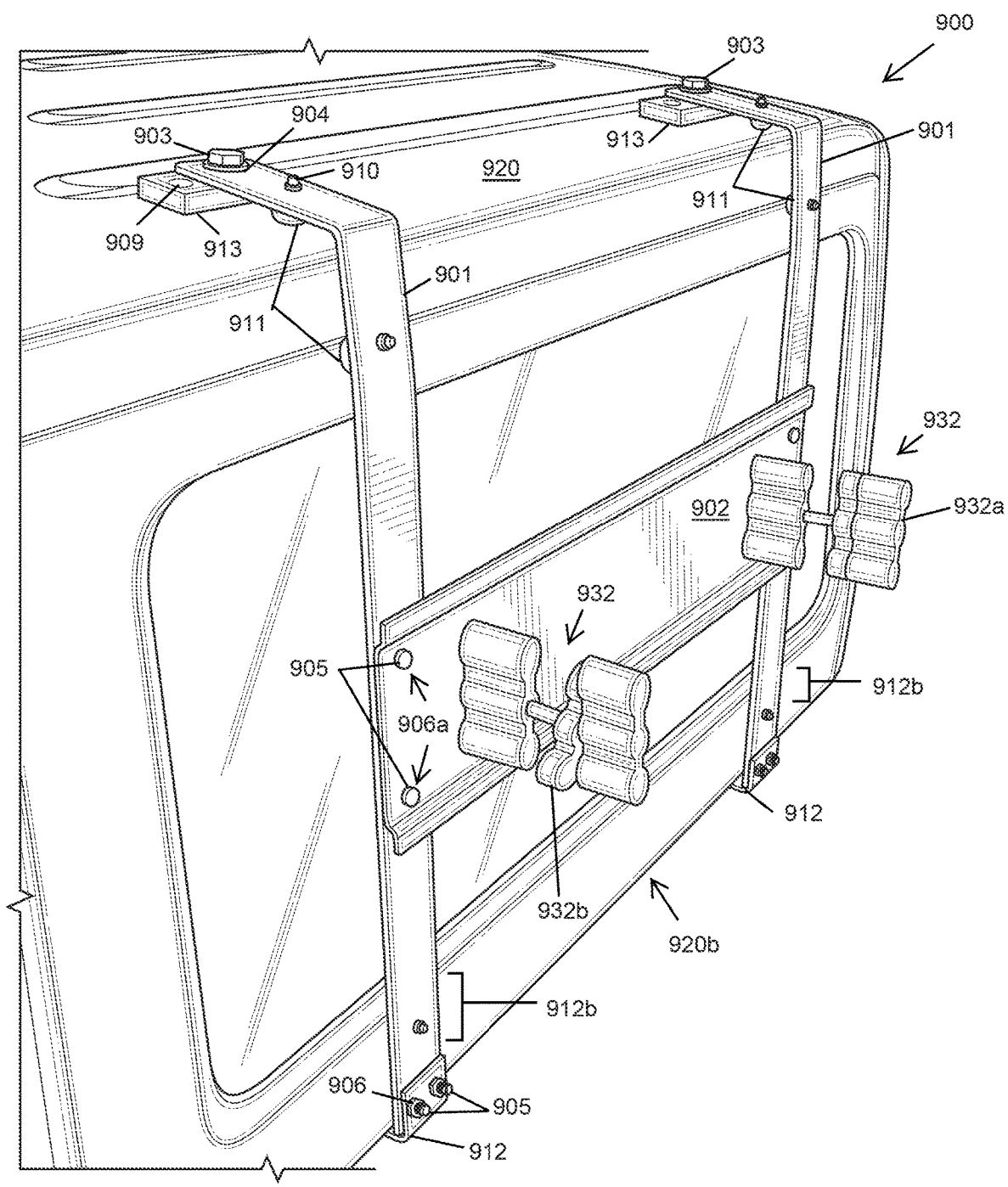
FIG. 9 shows the perspective view of the left side of the completed rack and bracket system on a partially shown exemplary hardtop vehicle, according to an aspect.

FIG. 9 shows the perspective view of the left side of the completed rack and bracket system 900 on a partially shown exemplary hardtop vehicle 920, according to an aspect. The vehicle on which the hardtop roof is provided is shown partially for visual clarity. The system 900 may be similar on the opposite side of the vehicle 920, for example. An advantage may be that the additional weight mounted onto and carried by the vehicle via the rack and bracket system 900 may be properly balanced on both sides of the vehicle, which can increase the safety of the user. Another advantage is that the large quantity of gasoline that can be carried by the rack and bracket system 900 does not need to be carried inside of the vehicle, therefore eliminating the safety hazard of carrying gasoline inside of the vehicle. Another advantage is that the gasoline canisters may be filled without removing the canisters or containers from the racks, thus providing the user with an easy and efficient method of loading and carrying the gasoline.

Mounting blocks 913, rivet screws 909, bracket arms 901, bolts 905, stoppers 911, and clamps 912 are visible in the exemplary view shown in FIG. 9. As described hereinbefore as an example, the bracket arms 901 may be attached to the top of the vehicle 920 by securing the arms 901 to mounting blocks 913.

Again, as was described when referring to FIG. 2, the rack and bracket system 900 components shown in FIG. 9 may be used in the following exemplary manner, and the following exemplary method may be used to assemble and mount the system 900.

First, the mounting blocks 913 may be secured to the vehicle 920. This may be performed by using a rivet screw 909, a rubber washer (as shown by 607 in FIG. 6), and a nut (as shown by 608 in FIG. 6), in each of the outer block holes (as shown by 528 in FIG. 5) of each block. This process may be repeated as many times as is necessary; as an example, four mounting blocks may be secured to the top of the vehicle 920, as is shown in FIG. 5 as an example.

Next, the bracket arms 901 may be fitted with stoppers 911, which may be secured to the bracket arms 901 using screw caps 910. The stoppers 911 may be used as shown in order to provide a barrier between the hard surfaces of the system 900 and the vehicle 920. Thus, an advantage may be that damage from the system 900 components may be prevented by the rubber stoppers 911, particularly when the vehicle 920 is in motion.

Next, the bracket arms 901 may be secured to the vehicle. Two bracket arms 901 may be secured to the left side of the vehicle 920 as is shown in FIG. 9, and two bracket arms 901 may also be secured to the right side of the vehicle. On the top of the vehicle 920, this may be performed by securing the bracket arm 901 to the mounting block 913, by aligning the top mounting hole (shown in an empty state by 201cc in FIG. 2) of the bracket arm 901 with the center block hole (shown in an empty state by 525 in FIG. 5) of the mounting block 913. A ½ bolt 903 may be inserted into the top mounting hole (201cc in FIG. 2) and the center block hole (525 in FIG. 5), and associated with large washer 904, and tightened by any suitable means. As shown, when the ½ bolt 903 is used to secure a bracket arm 901 to the mounting block 913, only the bolt head of the ½ bolt may be visible on the exterior of the vehicle 920. On the bottom of the hardtop of the vehicle 920, this may be performed by aligning a clamp 912 with the bracket arm 901, by aligning the clamp center holes (shown in an empty state by 812d in FIG. 8A) of the clamp 912 with the clamp mounting holes (shown in an empty state by 201d in FIG. 2) of the bracket arm 901. A ⁷⁄₁₆ bolt 905 may be inserted into the clamp center holes (812*d* in FIG. 8A) and the clamp mounting holes (201*d* in FIG. 2), and associated with a small washer 906, and tightened by any suitable means. As another example, if an underside 920*b* of a vehicle's hardtop is not available to the user or not available on a vehicle, the bracket arms 901 may be secured to the sides of the vehicle by other securing means, such as by additional mounting blocks on the regions indicated by 912*b*, or by directly bolting the bracket arms to the hardtop body. As an example, this may be performed via holes provided in the hardtop body. In such an aspect, the mounting arms may be provided with a bend at the top end and the bottom end (as shown by 201*b* in FIG. 2) may be straight and provided without a bend. The provided clamp 912 may also be adapted to fit such vehicles, such as by being straight at their bottom end. This process may be repeated as many times as necessary; for example, two bracket arms 901 may be mounted to a left side of the vehicle, and two bracket arms 901 may be mounted to a right side of the vehicle.

Next, a mounting plate 902 may be fixed onto bracket arms 901 with, for example, $\frac{7}{16}$-inch bolts 905. This may be performed by aligning the outer plate holes (shown in an empty state by 221 in FIG. 2) of the mounting plate 902 with the plate mounting holes (shown in an empty state by 201*e* in FIG. 2) of the bracket arms 901. The mounting plate 902 may be constructed from steel, as an example. A small washer (not visible, represented by 906*a*, and shown by 206 in FIG. 2) may also be used with each $\frac{7}{16}$-inch bolt 905.

Next, extensions 932 may then be added to the mounting plates 902, which may be used for receiving and securing a fuel container or any other similar container or cargo (such as the example shown by 131 in FIG. 1). The extensions 932 may be attached to the system 900 by associating the extensions with the inner plate holes (shown in an empty state by 222 in FIG. 2) of the mounting plate 902. One extension 932 may be attached to one pair of inner plate holes (222 in FIG. 2). As an example, two extensions 932 may to attached to each mounting plate 902. As an example, the extension 932 may be capable of being in an unlocked state or a locked state. For example, the container or cargo may be locked in place by inserting the container onto the extensions 932, and by turning a locking end 932*a*, such that the locking end 932*a* is turned from a vertical position as shown in FIG. 9 to the horizontal position as shown in FIG. 1. The extensions 932 may also be provided with additional components that may be known in the art such as the joint 932*b*, which may be used for holding a container tightly in place while the locking end 932*a* can be tightened, such as in a clockwise direction, to create a tighter grip on the container and thus limit its movements during transit. As another example, any other suitable securing means or storage means may also be attached to the mounting arms in place of or in addition to the extensions 932, such that any other additional cargo may be carried by the rack system 900.

It should be understood that the assembly and attachment of the rack and bracket system 900 to the vehicle 920 may be performed easily and efficiently by a user, by following the exemplary method described hereinbefore, and the disassembly and removal of the system 900 from the vehicle may also be performed easily and efficiently by a user by substantially reversing the steps of the described method. As an example, removal of the rack and bracket system 900 may be performed by removing the clamps 912 and the bolts 903, and the mounting blocks 913 may remain on the vehicle 920. Re-assembly of the rack and bracket system 900 may be performed by replacing the hardware without the need for making measurements and securing the mounting blocks 913 again. Thus, an advantage is that the removal and re-assembly of the rack and bracket system 900 may be easy and efficient for the user, and may be performed without assistance from another user. Another advantage of the system is that the vehicle may be minimally modified, and the hardtop of the vehicle may remain substantially whole with only drilled holes and without the need for removal of any vehicle parts or windows, for example.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A rack system for carrying a container and contents of the container on a first side of a vehicle, the rack system being configured to be mounted onto the first side of the vehicle, the rack system comprising a first set of mounting components having:
    a pair of bracket arms, each bracket arm of the pair of bracket arms having:
        an upper arm end;
        a bottom arm end;
        an arm body extending between the upper arm end to the bottom arm end;
        a top mounting hole within the upper arm end;
        a set of arm plate mounting holes within the arm body;
        a set of arm clamp mounting holes within the bottom arm end;
        a front arm side;
        a rear arm side; and
        a plurality of stopper holes;
        wherein the upper arm end is bent at an angle with respect to the arm body and the bottom arm end;
    a pair of mounting blocks, each mounting block of the pair of mounting blocks having:
        a center block hole;
        a left block side;
        a right block side; and
        a set of outer block holes disposed on the left block side and the right block side;
    a mounting plate having:
        a set of inner plate holes;
        a left plate side;
        a right plate side; and
        a set of outer plate holes disposed on the left plate side and on the right plate side;
    a pair of clamps, each clamp of the pair of clamps having:
        a clamp body; and
        a set of clamp center holes within the clamp body;
    a plurality of stoppers;
    a plurality of screw caps;
    each mounting block of the pair of mounting blocks being configured to be mounted onto a top side of the vehicle via a first set of securing means, wherein the first set of securing means is drilled into the top side of the vehicle through the set of outer block holes;
    each upper arm end being configured to be mounted onto a mounting block of the pair of mounting blocks via a second set of securing means, wherein the second set of securing means is secured through the top mounting hole and the center block hole;
    each clamp of the pair of clamps being configured to be associated with the bottom arm end of each bracket arm of the pair of bracket arms;
    each bottom arm end being configured to be mounted onto the first side of the vehicle via a third set of securing means, wherein the third set of securing means is secured through the set of clamp center holes and the set of arm clamp mounting holes;
    the mounting plate being configured to be mounted onto the pair of bracket arms via a fourth set of securing means, the fourth set of securing means being secured through the set of outer plate holes and the set of arm plate mounting holes;
    wherein each stopper of the plurality of stoppers is configured to fit into a stopper hole of the plurality of stopper holes on the rear arm side; and
    wherein each screw cap of the plurality of screw caps is configured to be screwed onto each stopper of the plurality of stoppers on the front arm side.

2. The rack system of claim 1, further comprising a second set of mounting components configured to be mounted onto a second side of the vehicle, the second side being opposite to the first side of the vehicle.

3. The rack system of claim 1,
    the first set of securing means comprising:
        a first set of screws;
        a first set of washers; and
        a first set of nuts;
    the second set of securing means comprising:
        a second set of washers; and
        a first set of bolts;
    the third set of securing means comprising:
        a third set of washers; and
        a second set of bolts; and
    the fourth set of securing means comprising:
        a fourth set of washers; and
        a third set of bolts.

4. The rack system of claim 1, each clamp of the pair of clamps further comprising a clamp bottom end extending outwards from the clamp body.

5. The rack system of claim 1, wherein the angle is 90 degrees.

6. The rack system of claim 1, wherein the contents of the container are approximately 4 gallons of fluid.

7. The rack system of claim 1, wherein the pair of bracket arms are powder coated.

8. The rack system of claim 1, wherein the set of inner plate holes are configured to receive a container carrying extension, the container carrying extension being capable of holding the container.

9. A rack system for carrying containers and contents of the containers on a vehicle, the rack system being configured to be mounted onto a first side and a second side of the vehicle, the second side being opposite to the first side, the rack system comprising:
    a plurality of bracket arms, each bracket arm of the plurality of bracket arms having:
        an upper arm end;
        a bottom arm end;
        a front arm side;
        a rear arm side;
        an arm body extending between the upper arm end to the bottom arm end;
        a top mounting hole within the upper arm end;

a set of arm plate mounting holes within the arm body;
a set of arm clamp mounting holes within the bottom arm end; and
a plurality of stopper holes;
wherein the upper arm end is bent at an angle with respect to the arm body and the bottom arm end;
a plurality of mounting blocks, each mounting block of the pair of mounting blocks having:
a center block hole;
a left block side;
a right block side; and
a set of outer block holes disposed on the left block side and the right block side;
a plurality of mounting plates, each mounting plate of the plurality of mounting plates having:
a set of inner plate holes;
a left plate side;
a right plate side; and
a set of outer plate holes disposed on the left plate side and on the right plate side;
a plurality of clamps, each clamp of the plurality of clamps having:
a clamp body; and
a set of clamp center holes within the clamp body;
a plurality of stoppers; and
a plurality of screw caps;
each mounting block of the plurality of mounting blocks being configured to be mounted onto a top side of the vehicle via a first set of securing means, wherein the first set of securing means is drilled into the top side of the vehicle through the set of outer block holes;
each upper arm end being configured to be mounted onto a mounting block of the plurality of mounting blocks via a second set of securing means, wherein the second set of securing means is secured through the top mounting hole and the center block hole;
each clamp of the plurality of clamps being configured to be associated with the bottom arm end of each bracket arm of the plurality of bracket arms;
each bottom arm end being configured to be mounted onto the first side or the second side of the vehicle via a third set of securing means, wherein the third set of securing means is secured through the set of clamp center holes and the set of arm clamp mounting holes;
the mounting plate being configured to be mounted onto the plurality of bracket arms via a fourth set of securing means, the fourth set of securing means being secured through the set of outer plate holes and the set of arm plate mounting holes;
each stopper of the plurality of stoppers being configured to fit into a stopper hole of the plurality of stopper holes on the rear arm side; and
each screw cap of the plurality of screw caps being configured to be screwed onto each stopper of the plurality of stoppers on the front arm side;
such that the rack system is configured to distribute a first weight of the containers on the first side and a second weight of the containers on the second side.

10. The rack system of claim 9,
the first set of securing means comprising:
a first set of screws;
a first set of washers; and
a first set of nuts;
the second set of securing means comprising:
a second set of washers; and
a first set of bolts;
the third set of securing means comprising:
a third set of washers; and
a second set of bolts; and
the fourth set of securing means comprising:
a fourth set of washers; and
a third set bolts.

11. The rack system of claim 9, each clamp of the plurality of clamps further comprising a clamp bottom end extending outwards from the clamp body.

12. The rack system of claim 9, wherein the contents of the container are approximately 8 gallons of fluid.

13. The rack system of claim 9, wherein the plurality of bracket arms are powder coated.

14. The rack system of claim 9, wherein the set of inner plate holes are configured to receive a container carrying extension, the container carrying extension being capable of holding the container.

15. A method of mounting and using a rack system on a vehicle having a top side, a first side, and a second side opposite to the first side, the rack system being configured for carrying a container and contents of the container, the rack system comprising a first set of mounting components having:
a pair of bracket arms, each bracket arm of the pair of bracket arms having:
an upper arm end;
a bottom arm end;
an arm body extending between the upper arm end to the bottom arm end;
a top mounting hole within the upper arm end;
a set of arm plate mounting holes within the arm body; and
a set of arm clamp mounting holes within the bottom arm end;
wherein the upper arm end is bent at an angle with respect to the arm body and the bottom arm end;
a pair of mounting blocks, each mounting block of the pair of mounting blocks having:
a center block hole;
a left block side;
a right block side; and
a set of outer block holes disposed on the left block side and the right block side;
a mounting plate having:
a set of inner plate holes;
a left plate side;
a right plate side; and
a set of outer plate holes disposed on the left plate side and on the right plate side;
a pair of clamps, each clamp of the pair of clamps having:
a clamp body; and
a set of clamp center holes within the clamp body;
each mounting block of the pair of mounting blocks being configured to be mounted onto a top side of the vehicle via a first set of securing means, wherein the first set of securing means is drilled into the top side of the vehicle through the set of outer block holes;
each upper arm end being configured to be mounted onto a mounting block of the pair of mounting blocks via a second set of securing means, wherein the second set of securing means is secured through the top mounting hole and the center block hole;
each clamp of the pair of clamps being configured to be associated with the bottom arm end of each bracket arm of the pair of bracket arms;
each bottom arm end being configured to be mounted onto the vehicle via a third set of securing means, wherein the third set of securing means is secured through the set of clamp center holes and the set of arm clamp mounting holes; and the mounting plate being configured to be mounted onto the pair of bracket arms via a fourth set of securing means, the fourth set of securing means being secured through the set of outer plate holes and the set of arm plate mounting holes; and wherein the set of inner plate holes are configured to receive a container carrying extension, the container carrying extension being capable of holding the container;

the method comprising the steps of:
  determining a length between the pair of mounting blocks;
  placing the pair of mounting blocks on the top side of the vehicle such that the pair of mounting blocks is aligned along the first side;
  using the set of outer block holes as drilling guides;
  drilling a set of holes into the top side where indicated by the drilling guides;
  securing the pair of mounting blocks to the top side via the first set of securing means through the set of outer block holes;
  aligning each top mounting hole with each center block hole;
  securing each bracket arm of the pair of bracket arms to a mounting block of the pair of mounting blocks via the second set of securing means through the top mounting hole and the center block hole;
  aligning each set of clamp center holes with each set of arm clamp mounting holes;
  securing each clamp of the pair of clamps to a bracket arm of the pair of bracket arms via the third set of securing means through the set of clamp center holes and the set of arm clamp mounting holes;
  aligning a first portion of the outer plate holes of the set of outer plate holes with a first set of arm plate mounting holes of the set of arm plate mounting holes;
  aligning a second portion of the outer plate holes of the set of outer plate holes with a second set of arm plate mounting holes of the set of arm plate mounting holes;
  securing the mounting plate to the pair of bracket arms via the fourth set of securing means through the set of outer plate holes and the set of arm plate mounting holes; and
  securing the container carrying extension to the set of inner plate holes.

16. The method of claim 15, further comprising the steps of:
  determining a need for removal of the rack system from the vehicle;
  removing the second set of securing means, the third set of securing means, and the fourth set of securing means.

17. The method of claim 15, the rack system further comprising a second set of mounting components configured to be mounted onto the second side of the vehicle;
  the method further comprising the step of:
    repeating on the second side of the vehicle the steps of determining, placing, using, drilling, aligning each top mounting hole, securing each bracket arm, aligning each set of clamp center holes, securing each clamp of the pair of clamps, aligning a first portion of the outer plate holes, aligning a second portion of the outer plate holes, and securing the mounting plate.

18. The method of claim 15, each bracket arm of the pair of bracket arms further comprising:
  a front arm side;
  a rear arm side; and
  a plurality of stopper holes; and
the rack system further comprising:
  a plurality of stoppers; and
  a plurality of screw caps;
wherein each stopper of the plurality of stoppers is configured to fit into a stopper hole of the plurality of stopper holes on the rear arm side; and
wherein each screw cap of the plurality of screw caps is configured to be screwed onto each stopper of the plurality of stoppers on the front arm side;
the method further comprising the steps of:
  fitting the plurality of stoppers into the plurality of stopper holes on the rear arm side; and
  securing the plurality of stoppers to the pair of bracket arms by screwing the plurality of screw caps onto the plurality of stoppers on the front arm side.

* * * * *